United States Patent [19]
Crosby et al.

[11] Patent Number: 5,608,027
[45] Date of Patent: Mar. 4, 1997

[54] COMPLEX STABILIZER COMPOSITION TO IMPROVE THE MELT STABILITY AND COLOR STABILITY OF POLYCARBONATES

[75] Inventors: Richard Crosby, West Coxsackle, N.Y.; James L. DeRudder, Mt. Vernon, Ind.; Larry I. Flowers; Ye-Gang Lin, both of Evansville, Ind.; Roy R. Odle, Mt. Vernon, Ind.

[73] Assignee: General Electric Company, Pittsfield, Mass.

[21] Appl. No.: 562,278

[22] Filed: Nov. 22, 1995

Related U.S. Application Data

[63] Continuation of Ser. No. 245,921, May 19, 1994, abandoned.

[51] Int. Cl.$^6$ ............................ C08G 18/08; C09K 15/32
[52] U.S. Cl. ............................ 528/51; 528/141; 528/196; 528/198; 528/200; 528/242; 528/286; 528/287; 524/147; 524/151; 252/400.2
[58] Field of Search ........................... 528/51, 141, 242, 528/286, 287, 196, 198, 200; 524/147, 151; 252/400.2

[56] References Cited

U.S. PATENT DOCUMENTS

| | | |
|---|---|---|
| 3,028,365 | 4/1962 | Schnell et al. . |
| 3,030,331 | 4/1962 | Goldberg . |
| 3,169,121 | 2/1965 | Goldberg . |
| 3,275,601 | 9/1966 | Schnell et al. . |
| 3,334,154 | 8/1967 | Kim . |
| 3,622,538 | 11/1971 | Green . |
| 3,784,595 | 1/1974 | Schirmer et al. . |
| 3,809,676 | 5/1974 | Liberti . |
| 3,824,205 | 7/1974 | Demarcq et al. ........................ 524/151 |
| 3,836,499 | 9/1974 | Schirmer et al. . |
| 3,915,926 | 10/1975 | Wambach . |
| 4,088,709 | 5/1978 | Seymour et al. . |
| 4,093,588 | 6/1978 | Spivack et al. . |
| 4,097,547 | 6/1978 | Cleveland et al. . |
| 4,131,575 | 12/1978 | Adelmann et al. . |
| 4,143,024 | 3/1979 | Adelmann et al. . |
| 4,172,858 | 10/1979 | Clubley ........................ 524/151 |
| 4,178,281 | 12/1979 | Horn, Jr. . |
| 4,248,976 | 2/1981 | Clubley et al. . |
| 4,308,196 | 12/1981 | Limbert . |
| 4,313,870 | 2/1982 | Imai et al. . |
| 4,316,981 | 2/1982 | Brunelle . |
| 4,323,501 | 4/1982 | Eimers et al. . |
| 4,333,868 | 6/1982 | Schmidt et al. . |
| 4,346,025 | 8/1982 | Leistner et al. ........................ 524/151 |
| 4,360,617 | 11/1982 | Muller et al. . |
| 4,415,696 | 11/1983 | Mark . |
| 4,456,725 | 6/1984 | Liu et al. . |
| 4,521,562 | 6/1985 | Rosenquist . |
| 4,678,845 | 7/1987 | Takamatsu et al. . |
| 4,743,641 | 5/1988 | Shizawa et al. . |
| 4,762,873 | 8/1988 | Miyauchi et al. . |
| 4,812,498 | 3/1989 | Nakahara et al. . |
| 4,873,314 | 10/1989 | Berg et al. . |
| 4,948,871 | 8/1990 | Fukuoka et al. . |
| 5,026,817 | 6/1991 | Sakashita et al. . |
| 5,132,447 | 7/1992 | King, Jr. . |
| 5,162,548 | 11/1992 | Foa' et al. . |
| 5,168,112 | 12/1992 | Ueda et al. . |
| 5,187,242 | 2/1993 | Sakashita et al. . |
| 5,225,526 | 7/1993 | Fukawa et al. . |
| 5,231,210 | 7/1993 | Joyce et al. . |
| 5,240,986 | 8/1993 | Ohtsubo ........................ 524/151 |
| 5,243,093 | 9/1993 | Kissinger et al. . |
| 5,250,655 | 10/1993 | Yokoyama et al. ........................ 528/200 |
| 5,278,279 | 1/1994 | Kanno et al. ........................ 528/198 |
| 5,281,640 | 1/1994 | Regnat et al. ........................ 524/151 |

FOREIGN PATENT DOCUMENTS

| | | |
|---|---|---|
| 076468 | 4/1983 | European Pat. Off. . |
| 0205192A1 | 12/1986 | European Pat. Off. . |
| 0435124A2 | 7/1991 | European Pat. Off. . |
| 604074 | 6/1994 | European Pat. Off. . |
| 2615341 | 10/1977 | Germany . |
| 54-114597 | 9/1979 | Japan . |
| 59-12961 | 1/1984 | Japan . |
| 59-12962 | 1/1984 | Japan . |
| 61-16961 | 1/1986 | Japan . |
| 1-284549 | 5/1988 | Japan . |
| 1-242660 | 9/1989 | Japan . |
| 1315459 | 12/1989 | Japan . |
| 218332 | 1/1990 | Japan . |
| 2-18333 | 1/1990 | Japan . |
| 3-292361 | 12/1991 | Japan . |
| 4-253765 | 9/1992 | Japan . |

*Primary Examiner*—James J. Seidleck
*Assistant Examiner*—John M. Cooney, Jr.

[57] ABSTRACT

A composition comprising a phosphorus containing acid and an ester of a phosphorus containing acid useful for imparting improved physical and chemical properties to polymers containing polyesters, copolyester carbonates, polycarbonates, and mixtures thereof, a method of treating said polymers with said composition, and articles of manufacture comprising said polymers and said composition.

35 Claims, No Drawings

10

COMPLEX STABILIZER COMPOSITION TO IMPROVE THE MELT STABILITY AND COLOR STABILITY OF POLYCARBONATES

"This is a continuation of Ser. No. 08/245,921 filed on May 19, 1994 which is now abandoned."

FIELD OF THE INVENTION

The instant invention is a composition and process related to the manufacture of polycarbonate polymers. More particularly the instant invention is directed to a chemical composition that stabilizes polycarbonates manufactured either by interfacial polymerization, by melt process polymerization, or by solid state polymerization of partially polymerized precursors. The instant invention involves combinations of conventional stabilizers that in a novel combination show heretofore unknown and unexpectedly dramatic improvements in the stability of polycarbonate.

BACKGROUND OF THE INVENTION

Polycarbonate has been a commercially available thermoplastic for many years. It is known for its high impact strength and clarity. As with all commercially useful materials there are continual efforts to improve its properties. Quite often small technical improvements in physical or chemical properties have large ramifications in the marketplace.

One area of particular commercial importance is improvement of the stability of polymers. Example of such stability are: thermal stability, rheological stability, color stability, oxidative stability, ozonation stability, light stability, ultraviolet light stability, gamma radiation stability, and hydrolytic stability. In each case specific chemical agents have been identified that improve one of these specific types of commercially important stability parameters. This can result in a large number of similar products that differ only in their relative stability to various different conditions. The process of developing compositions that only meet single requirements excludes the applications that have multiple stability requirements. As is taught for example by Fukawa, et al. in U.S. Pat. No. 5,225,526 "there have not yet been obtained any stabilized compositions which are free from all of the noted problems: heat resistance, hot water resistance and coloration in recycle molding". Thus, Fukawa et al. recognize that the systematic approach to improved stability across more than a single parameter or requirement is recognized as a serious deficiency in the prior art.

The problem of polymer degradation is typically managed by the addition of various stabilizers and additives to the polymer. Since the art is not systematic and predictive, these solutions are varied and many and do not provide a consistent basis for prediction of effects as the polymer to be stabilized is varied or as chemical changes are made to the stabilizer compounds used. The art thus contains conflicting statements and teachings.

SUMMARY OF THE INVENTION

The present invention is based on the discovery that certain novel combinations of phosphorus containing acids and esters of phosphorus containing acids allow the simultaneous achievement of more than one stabilizing effect.

Broadly stated the instant invention comprises a composition comprising:

(1) a phosphorus containing acid, and (2) an ester of a phosphorus containing acid.

Additionally, the instant invention further comprises treating a polyester or polycarbonate or mixtures thereof with the composition of the present invention.

The instant invention further comprises polyester, copolyester carbonates, or polycarbonate polymers or mixtures thereof that have been so treated.

DETAILED DESCRIPTION OF THE INVENTION

Broadly stated, the stabilizing mixture comprises a phosphorus containing oxy-acid, a phosphorus containing stabilizer comprising of at least one unhindered group and, optionally, a phosphorus containing stabilizer comprising of sterically hindered groups, which will quench, inactivate or deactivate undesirable components such as disodium-BPA and serve as a thermal stabilizer to improve the color and viscosity stability of the resin. Furthermore, the combination effect of the multi component system of a phosphorus containing acid and one or more stabilizers achieves a totally unexpected combination of properties that are desirable.

One embodiment of the instant invention is a resin composition comprising a mixture of a thermoplastic polymer resin phase with an effective stabilizing mixture comprising a phosphorus containing stabilizer of one or more states of steric hindrance with a phosphorus containing oxy-acid. This resin composition has demonstrated improved color and viscosity stability. Preferably the instant invention comprises a phosphorus containing oxy-acid. More preferably the acid will include one of the following: phosphoric acid, phosphorous acid, hypophosphorous acid, hypophosphoric acid, phosphinic acid, phosphonic acid, metaphosphoric acid, hexametaphosphoric acid, thiophosphoric acid, fluorophosphoric acid, difluorophosphoric acid, fluorophosphorous acid, difluorophosphorous acid, fluorohypophosphorous acid, or fluorohypophosphoric acid.

In one particular embodiment, the instant invention comprises a composition for deactivating trans-esterification catalysts, polycarbonate synthesis or condensation catalysts comprising:

(1) a multi-protic phosphorus containing oxy-acid having the general formula:

where m and n are each 2 or greater and t is 1 or greater; and (2) a tri-ester of a multi-protic phosphorus containing acid having the general formula:

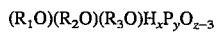

where x, may be zero or a positive integer and z may be 3 or greater, y is 1 or greater,; and $R_1$, $R_2$, and $R_3$, are organic radicals; wherein the acid and the tri-ester are present in the composition in the ratio of about one equivalent of the tri-ester ester to about two equivalents of the acid.

Generally described, the instant invention is the approximately stoichiometric deactivation or inactivation of the catalytic components utilized for the preparation of polyester or polycarbonate containing polymers and polymer alloys. The invention is further useful for the approximately stoichiometric deactivation of various additives, stabilizers and the like which if in excess have a tendency to function as catalysts themselves thus affording the opportunity to re-establish chemical equilibria and consequently reverse the polymerization reaction thereby producing monomers and oligomers that would ordinarily tend to degrade the quality of the final polymer product. The invention comprises a composition, the application of that composition to a polymerization process, and polymers comprising the compositions. The composition of the present invention usually comprises a multi-protic oxygen and phosphorus comprising acid and tri-ester of a multi-protic oxygen and phosphorus comprising acid in amounts sufficient to quench, inactivate or deactivate catalysts, catalyst residues, reaction modifiers and the various other additives that may have a deleterious effect on the final polymer product.

The phrase multi-protic oxygen and phosphorus comprising acid is intended to encompass a broad class of phosphorus and oxygen containing acids that ranges from the simple three element compositions of phosphoric, phosphorous, and phosphonic acids through and beyond the more complex examples such as the phosphotungstic, phosphomolybdic, and the hetero- and iso-poly phosphorus containing series of acids. While the specific formula recited above is limited to phosphorus oxy-acids wherein the oxidation state and acid equivalence of the phosphorus containing acid may vary, it is contemplated that any phosphorus containing acid that beneficially functions in combination with the tri-ester compounds of a phosphorus containing oxy-acid to improve the stability of polyester or polycarbonate containing polymers falls within the scope of this disclosure and is therefore equivalent to the claimed compounds, by virtue of a similar or identical function. Thus thio-phosphoric acids and fluoro-phosphoric acids, their homologs and periodic table congeneric analogs are contemplated as directly functional equivalents to those acids disclosed and claimed herein.

The compositions of the present invention comprise said acid in the ratio ranging from about 0.1 to 10 moles of acid to about 0.1 to 10 moles of said tri-ester. The ratio generally ranges from about 1 mole acid to about 10 moles tri-ester, more preferably from about 1 mole acid to about 5 moles tri-ester, and most preferably from about 1 mole acid to a range between from about 1.0 and 2.5 moles tri-ester. The mixture is generally applied to the process stream at some stoichiometric ratio initially based on the level of components to be deactivated and adjusted (either increased or decreased) for effectiveness factors, activity coefficients, and volatility and solubility considerations, ranging from a level of about 0.5 parts per billion by weight up to about 5 weight percent of phosphorus, based on the final weight of the treated polymer; generally functioning in situ. Thus the word stoichiometric or the phrase approximately stoichiometric is taken to mean a stoichiometric quantity increased or decreased by the various considerations of effectiveness factors, activity coefficients, volatility, solubility, and others as they may apply. While the mole ratio of about 0.5 moles acid to about 1 moles tri-ester is most preferred, since it is believed that a unique mixture of components is produced by the interaction of the acid and the tri-ester, some variation in the mole ratio may be tolerated due to the nature of the interaction between the acid and the tri-ester with the polymer environment to which it is added. The ratio may range from about 1 mole acid to about 10 moles tri-ester, more preferably from about 1 mole acid to about 5 moles triester, and most preferably from about 1 mole acid to a range between from about 1.0 and 2.5 moles tri-ester.

While not wishing to be bound by theory, Applicants speculate that the mixture of acid and ester provides a deactivating composition that may be employed in situ that 1) self-replenishes the equilibrium derived constituents, 2) deactivates the various components of the reaction mixture producing the polymer, 3) produces a variety of deactivating constituents each of which may be optimal for a particular catalytic component requiring eventual deactivation by virtue of the equilibria established, and 4) beneficiates the polymer being treated.

A multi-protic phosphorus containing oxy-acid has the general formula:

$$H_aP_bO_cQ_P$$

where a and c are each independently greater than 1 and preferably ranging from 2 to 4 when b is 1, b is 1 or greater, and Q may be present as a single element or a group of elements wherein the subscript p is 0 or greater for each different elemental Q present, Q being selected from the group consisting of Mo, W, Nb, Ta, As, Sb, Bi, and divalent organic radicals with the subscript p preferably zero; the formula being subject to the constraint that the stoichiometric coefficient of the oxygen present in the acid, z, is such that the formula conforms to the requirements of the oxidation state of the constituent elements present such that as the parent acid, the acid in its un-ionized form is electrically neutral; such complex acids are contemplated as functional equivalents of the simpler acids represented by the formulas of the most preferred acids: $H_3PO_4$, $H_3PO_3$, and $H_3PO_2$. Multi-nuclear phosphorus acids such as pyrophosphoric, $H_3P_2O_7$, and higher analogs are included as members of the genus defined by the above formula.

A tri-ester of a multi-protic phosphorus containing acid has the general formula:

$$(R_1O)(R_2O)(R_3O_w)H_xP_yO_{z-3}$$

where w is 0 or 1, and where x, may be zero or a positive integer and z may be 3 or greater, y is 1 or greater,; and $R_1$, $R_2$, and $R_3$, may be the same or different and are organic radicals preferably organic radicals, and most preferably alkylaromatic hydrocarbyl radicals. $R_1$, $R_2$, and $R_3$ may be the same or different and are selected from the group consisting of monovalent alkyl radicals having 2–18 carbon atoms, monovalent aryl or substituted aryl radicals having 6–15 carbon atoms, divalent alkyl or poly(alkylene oxide) radicals having 2–12 carbon atoms, a mixed alkyl-aryl radical having 6–35 carbon atoms, or halogenated substituents thereof wherein the substituted aryl radicals are substituted at the meta or para position of the aryl group and range in level of substitution from monosubstituted to tri-substituted. The preferred esters comprising the composition of the instant invention are tri-esters of the preferred mononuclear phosphorus acids. The most preferred tri-esters are the tri-esters of phosphorus acid. Applicants note that esters of the multi-nuclear phosphorus acids such as pyrophosphoric, $H_3P_2O_7$, and higher analogs are included as members of the genus defined by the above ester formula. Also included by virtue of the divalent hydrocarbon radical are such internal and multiply internal phosphite esters, e.g. tetrakis(2,4-di-tertiary-butylphenyl)-1,1'-biphenyl-4,4'-diyl-bisphosphonite.

An important consideration in selecting of acids and esters to be utilized in the process of the instant invention is the solubility in the polymer phase and relative vapor pressures of the components comprising the composition. These parameters should be in ranges such that effective amounts of the composition of the present invention remain in the polymer phase throughout subsequent processing. If a particularly volatile species is selected for use, its concentration in the polymer phase should be adjusted for losses due to volatilization during processing.

The process of the invention comprises synthesizing the various thermoplastic polymers treating those polymers with the composition of the invention. The composition of the invention particularly suited for treating various polymers, particularly thermoplastic polymers, such as polymers comprising polycarbonate or polycarbonate polymer alloy, e.g. co-polyester polycarbonate, co-polyamide polycarbonate, and co-polyimide polycarbonate; polymeric vinyl halides; vinyl esters; copolymers of vinyl compounds with α, β unsaturated ketones; copolymers with α, β unsaturated aldehydes and unsaturated hydrocarbons, e.g. butadiene and styrene; polyolefins and polyolefin copolymers; diene polymers, e.g. polybutadiene; polyurethanes; polyamides, e.g. polyhexamethyleneadipamide and polycaprolactam; polyesters, e.g. polyethylene terephthalate or polybutylene terephthalate; the preferred polycarbonates and polycarbonate alloys; polyacetal; polystyrene; polyethylene oxide; polyphenylene oxide; polyphenylene sulfide; high impact polystyrene containing copolymers of acrylonitrile, butadiene and/or styrene; and the natural and synthetic rubbers. The composition of the invention may be added to thermoplastic polymers in the practice of the process of the invention either separately or in combination as its constituent components or as precursors that will form those constituent components or any suitable mixture thereof.

The instant invention is directed to this novel combination of reagents that are used to quench, inactivate or deactivate the catalyst, catalyst residues, reaction modifiers, and contaminants based on relative stoichiometries and the acidic or basic nature of the catalysts and reaction modifiers such that the extent of de-polymerization and product polymer degradation is reduced. The combination of the instant invention is preferably employed in situ. The problem solved by the instant invention relates not only to preventing polymer degradation but also to the discovery of suitable catalyst and reaction modifier inactivating or deactivating agents that are compatible with the polycarbonate polymer and do not create new problems as old ones are solved.

It has unexpectedly been found that the addition of a phosphorus containing acid to a tri-ester of a phosphorus containing acid improves the stabilization effects due to the addition of the ester when compared to the addition of the ester without the addition of the acid. It has unexpectedly been found that the addition of phosphorous or phosphoric acid to tris(nonylphenyl)phosphite improves the stabilization effects due to the addition of the tris(nonylphenyl)phosphite when compared to the addition of tris(nonylphenyl)phosphite without the addition of the acid. This is an unexpected result because tris(nonylphenyl)phosphite is recognized as hydrolytically unstable, its combination with a proton donor that is stronger proton donor than water, e.g. an acid, in particular, $H_3PO_3$, would not have been expected to produce improved beneficial results, because the tris(nonylphenyl)phosphite is being used under conditions where its chemical integrity is subject to a stronger attack, i.e. acid catalyzed hydrolysis employing a strong mineral acid as opposed to water which is a weaker acid. The addition of tris(nonylphenyl)phosphite and phosphorous acid to the polymer produced unexpected results insofar as the addition of a small quantity of the two compounds had a very large beneficial effect in terms of simultaneously improving both melt stability and color retention, i.e. an enhanced resistance to yellowing. This result is a result contrary to some of the teachings in the art because the addition of phosphite ester hydrolysis products to polyesters or polycarbonates has generally been perceived as undesirable. Further, the acid itself, phosphorous acid, is the end hydrolysis product of all phosphite esters. Thus, the addition of phosphorous acid should not have been expected to improve the effects of adding a small quantity of a phosphite ester to polycarbonate. The data supporting these findings are summarized in Tables 1, 2, and 3.

Many types of reactions may be used to synthesize polyesters. Polyesters are heterochain macromolecular substances characterized by the presence of carboxylate ester groups in the repeating units of their main chains. The starting materials required consist of a dibasic acid or a reactive derivative such as a salt and a bi-functional esterifiable organic compound. If the acid is limited to carbon bearing species then the polymer is completely organic in nature in terms of its constituent compounds. The simplest dibasic carbon bearing acid is carbonic acid. The polyester derivatives of this acid constitute a large class of commercially significant polymers known as polycarbonates. Higher acids lead to other well-known polyester polymers. In the case of the polycarbonates, the bi-functional phenols when reacted with carbonic acid derivatives such as phosgene lead to materials possessing a number of desirable properties.

The polymerization reactions leading to these desirable and commercially significant products may involve among others a stepwise esterification or the polymerization of a polymerizable ester. The difference between these two particular examples is in the manner in which the polymer chain is built up. Other reactions may involve a polymerizing transesterification and may or may not be conducted without the benefit of or complications associated with solvent based reaction scheme. While simple esterification reactions involve the elimination of water in the condensation to form the ester linkage as in all reactions the removal of product water will generate a mass action effect that will tend to shift the esterification polymerization equilibrium in the direction of the desired polymeric product. This may be accomplished by any of several techniques.

Generally, to achieve commercially significant rates of reaction two techniques are routinely employed, increasing the reaction by the application of heat or increasing the reaction rate by the use of catalysts. Since the polymers under consideration are organic in nature, the application of heat can frequently introduce other problems in addition to adding to the cost of the process through an increase in the utility heat duty. The use of catalysts to increase reaction rates has one benefit in that an increased heat duty is generally not necessary. However, the use of catalysts introduces the significant possibility that the product polymer will be contaminated by the presence of catalytic material. An ideal catalyst is one that has a high activity and selectivity towards the desired polymer product but is almost or completely insoluble in the product polymer. These conditions which are contrary or contradictory requirements when jointly imposed, subtend a contradiction and consequently manufacturers are faced with the need to use catalysts that are soluble in the polymerizing media so as to effect an economically reasonable reaction rate. This leads to polymer contamination and degradation.

Direct polymerizing esterification usually consists of heating a hydroxycarboxylic acid or a mixture of a diol with a dicarboxylic acid (or acid anhydride or halide) to temperatures at which esterification occurs with the formation of polyester and by-product water. In practice the temperature is usually increased above the boiling point of water to some upper limit. This upper limit represents a balance between that temperature required for the reaction to proceed and the threshold temperature where thermal degradation of the polymer begins to become a significant factor in the process.

In the case of polycarbonates the direct polymerization reactions of commercial significance are limited to the interfacial polymerization and a melt phase polymerizing transesterification. Interfacial polymerization in the context of polycarbonate synthesis involves a multiplicity of reaction stages. Using a specific process as an example, in the first stage, the disodium salt of bisphenol-A in an aqueous alkaline solution is phosgenated in the presence of an inert solvent. The organic solvent initially serves as a solvent for the phosgene however as the reaction proceeds the solvent also serves to dissolve arylchloro-carbonates and oligocarbonates. Chlorinated hydrocarbons such as methylene chloride, 1,2-dichloroethane, chlorobenzene, and chloroform are typically used. Tetrahydrofuran, dioxane, and anisole have also been used.

In the second stage, the oligocarbonates are condensed to high molecular weight polycarbonates over catalysts, which can be added before or during phosgenation. Tertiary amines seem to be particularly effective catalysts.

Phase transfer catalysts, typically the onium salts of Group V elements, nitrogen, phosphorus, and arsenic, cause formation of the polymer to occur in a different fashion. Catalysts of this type are particularly useful for polymer synthesis involving hindered bisphenols such as the tetramethyl- and tetrabromo-bisphenol-A, where the catalysts act as carriers between the aqueous and organic phases. In this case, phenolate reacts with phosgene or oligocarbonates that contain terminal chloroformate groups. The reaction rate is controlled by the diffusion constant for transfer of the adducts from the aqueous to the organic phase and the back-diffusion of the re-synthesized onium salt into the aqueous phase.

The degree of polymerization depends on efficient mixing of the emulsion and on the alkali content of the aqueous phase. A constant pH of 12 seems desirable although lower pH levels of from about 8 to about 10 have also been recommended. The temperature usually varies between 10° and 35° C. By adding chain terminators the desired molecular weight of the bisphenol-A polycarbonate can be controlled. After polymerization is complete, the organic polycarbonate containing phase is separated from the aqueous phase that contains excess alkali and inorganic salts. The organic phase is washed with water until it is neutral and free of electrolytes. Typically, the polymer is spray dried and subsequently worked-up with a devolatilizing extruder.

In the transesterification, aromatic di-esters of carbonic acid are condensed with dihydroxyaryls in the presence of basic catalysts to yield high molecular weight polycarbonates. Melt transesterification has several advantages, the absence of solvents and associated recovery steps and a somewhat easier workup of the polymer. The advantages are offset by the complicated apparatus required to maintain high temperatures simultaneously with low pressures and the high melt viscosity of the product polymer. Furthermore, side reactions typically impart a yellowish cast or color to the product polymer. The condensed phase nature of the melt transesterification also renders molecular weight regulation of the product polymer significantly more difficult Both the interfacial polymerization and the melt transesterification require the use of catalysts to achieve the condensation polymerization to produce the polyester or the polycarbonate. Catalysts for ester exchange reactions are typically weak bases such as the carbonates, alkanoates, hydrides, or alkoxides of sodium, lithium, zinc, calcium, magnesium, and titanium or bimetallic alkoxides such as $NaHTi(OC_4H_9)_6$, $MgTi(OC_4H_9)_6$, and $CaTi(OC_4H_9)_6$ used in amounts ranging from 0.005 weight percent up to about 1 weight percent, occasionally even higher levels are used. The role of these catalysts is to assist in converting the reacting hydroxyl group to the corresponding alkoxide or phenoxide ion, which is the reactive intermediate preferred for the ester exchange reactions that are taking place that cause or result in the condensation polymerization. By using aryl esters as reaction components, the superior leaving group characteristics of the phenoxide (or aryloxide) anion are exploited. This more than offsets the lower nucleophilicity of the phenoxide anion versus alkoxide anions. These processes are suitably employed to prepare a wide variety of polycarbonate containing resins including homo- or co-polycarbonate resin compositions or alloys.

There is a high requirement for purity in the reactants utilized for the manufacture of polycarbonates. The presence of monofunctional contaminants limits chain growth. Thus control of these impurities is particularly important to the control of the final molecular weight of the polymer product. Additionally product quality appears to be highly related to the presence of even small amounts of impurities. The levels of impurities is generally controlled by the application to be made of the final product. This usually results in fairly stringent purity specifications for the starting materials, generally in the range of 99.5% or better.

Direct polyesterification reactions are usually catalyzed by the unreacted —COOH acid groups. However as the esterification reaction proceeds these groups are consumed. Thus in order to maintain reaction rates that are sufficiently fast to be commercially acceptable, catalysts are employed for the direct esterification. These catalysts include among others, protonic acids, Lewis acids, titanium alkoxides, and dialkyltin(IV) oxides. Strongly acidic catalysts tend to promote discoloration and hydrolysis of the product polymer unless they are neutralized and/or removed from the polyesters. As previously noted, the presence of acidic catalysts will have a tendency to extract trace quantities of catalytically active materials from the reactor walls. Thus, in general it is preferable to use a synthetic approach wherein an excess of diol is condensed with the di-acid followed by a base catalyzed alcoholysis to obtain high molecular weights. However, formation of polyesters involves organic acids and their derivatives and this will provide, however weakly, an opportunity for trace metal contamination even when base catalysis is employed. This is especially significant if the organic acid can function as a complexing or chelating agent for metal cations.

Frequently, because of the decarboxylation occurring with certain susceptible acids, an approach utilizing transesterification is employed. In this approach the acid or carbonate precursor compounds are replaced by derivatives containing the required structural units but possessing more tractable physical properties. These are then reacted under conditions of transesterification to generated the desired polymer by controlling the reaction conditions such that the monomeric or lower molecular weight reaction products are distilled from the reactant mixture. This approach seems to have it most widespread utility in the manufacture of the special class of polyesters known as polycarbonates.

Polycarbonates may be prepared by the reaction of carbonic acid derivatives with diols. The most typical diol is bisphenol-A and the most typical acid derivative is phosgene. However, other polyesters of bisphenol-A may be prepared by the substitution of various other acid derivatives for the carbonic acid derivative when the acid derivative contains two or more carbons in contrast to the derivatives of carbonic acid, the resulting polymer is a polyester.

Additional alternative routes to polyesters of bisphenols utilize transacylation or acylation with bis(carbonyl chloride)s. An example, an alkanoic diester of bisphenol is heated with a dicarboxylic acid liberating a volatile alkanoic acid which is removed by distillation. The reaction is then completed at higher temperatures and lower pressures. While catalysis is not required, this type of reaction frequently is catalyzed by the addition of a metal acetate. Metal catalysts thus are routinely used in the formation of polyester and polycarbonate polymers however synthesized and must either be removed, inactivated, quenched, or deactivated or their effects otherwise mitigated. One approach has been to mitigate the effects of residual quantities of polymerization catalysts first by washing the polymer and then by adding thermal stabilizers when the polymer is processed. However, in many polymer systems, catalysts and contaminants can only be partially removed, if they can be removed at all. The instant invention provides for a means of stoichiometrically quenching, inactivating, or deactivating in situ the residual catalyst present in the product polymer thereby reducing polymer quality degradation and the extent of subsequently catalyzed de-polymerization. While a preferred embodiment encompasses treating polymers comprising polycarbonate or polycarbonate polymer alloy such as co-polyester polycarbonate, co-polyamide polycarbonate, and co-polyimide polycarbonate, the composition and process of the instant invention are also suitable for treating other polymers as well such as polymeric vinyl halides, vinyl esters, copolymers of vinyl compounds with $\alpha,\beta$ unsaturated ketones, copolymers with $\alpha, \beta$ unsaturated aldehydes and unsaturated hydrocarbons such as butadiene and styrene, polyolefins and polyolefin copolymers, diene polymers such as polybutadiene, polyurethanes, polyamides such as polyhexamethyleneadipamide and polycaprolactam, polyesters such as polyethylene terephthalate or polybutylene terephthalate, the preferred polycarbonates and polycarbonate alloys, polyacetal, polystyrene, polyethylene oxide, polyphenylene oxide, polyphenylene sulfide, and high impact polystyrene containing copolymers of acrylonitrile, butadiene and/or styrene and natural and synthetic rubbers.

In one embodiment of the instant invention, the quantity of catalysts, catalyst residues, reaction modifiers and other chemical agents that may come from polymerization or any other ingredients in a final commercial formulation having a deleterious effect on the quality of the final product polymer which require stabilization, quenching, inactivation or deactivation, such improvements comprising, but not limited to increases in the thermal and hydrolytic stability of the polymer and increases in resistance to color degradation and melt degradation of the polymer. Applicants note that the effective amount of the composition of the instant invention may be greater than that required by the primary consideration of stoichiometric factors due to the necessity for considering other factors such as solubility, volatility, effectiveness factors, and the extent of applicable equilibria.

In a preferred embodiment of the instant invention, the quantity of catalysts, catalyst residues, reaction modifiers or any other ingredients in a final commercial formulation and other chemical agents having a deleterious effect on the quality of the final product polymer which require stabilization, quenching, inactivation or deactivation, said composition added, in an effective amount, to the polymer whereby said composition functions in situ to produce improvements in polymer quality, such improvements comprising but not limited to increases in the thermal and hydrolytic stability of the polymer and increases in resistance to color degradation or melt degradation of the polymer.

The instant invention further comprises a phosphorus containing stabilizer with one or more sterically unhindered organic radicals. Generally stated this phosphorus containing stabilizer comprises mixtures of one or more tris organically substituted phosphorus ester phosphites or phosphoric ester phosphates of the general structure $(RO)_3$—P, $(RO)_2PR$, or $(RO)_3$—P=O in which R may be the same or different and can be selected from the group comprising monovalent alkyl radicals having 2–18 carbon atoms, monovalent aryl or substituted aryl radicals having 6–15 carbon atoms, divalent alkyl or poly(alkylene oxide) radicals having 2–12 carbon atoms, a mixed alkyl-aryl radical having 6–35 carbon atoms, or halogenated substituents thereof. It is preferable that the sterically unhindered phosphorus containing stabilizer comprises mixtures of one or more tris organically substituted phosphorus ester phosphites or phosphoric ester phosphates of the general structure $(RO)_3$—P, $(RO)_2PR$, or $(RO)_3$—P=O in which R may be the same or different and can be selected from the group comprising nonyl phenyl ester, phenyl ester, tridecyl ester, decyl ester, or didecyl ester. It is even more preferable that the sterically unhindered phosphorus containing stabilizer comprises mixtures of one or more of the following: tris(nonylphenyl)phosphite, a mixture of 1 part didecylphenylphosphite with 1 part triphenylphosphite with 2 parts diphenyldecylphosphite, triphenylphosphite, diphenyl isodecyl phosphite, a mixture of tridecylphosphite with phenyldidecylphosphite with decyldiphenylphosphite and triphenylphosphite, or tetrakis(2,4-di-tertiary-butylphenyl)-1,1 '-biphenyl-4,4'-diylbisphosphonite. Most preferably the sterically unhindered phosphorus containing stabilizer comprises mixtures containing tris(p-nonylphenyl) phosphite.

The instant invention may optionally further comprise a phosphorus containing stabilizer with sterically hindered organic radicals. Generally stated this phosphorus containing stabilizer comprises mixtures of one or more tris-organically substituted phosphorus ester phosphites or phosphoric ester phosphates of the general structure $(RO)_3$—P or $(RO)_3$—P=O in which R may be the same or different and can be selected from the group comprising monovalent alkyl radicals having 2–18 carbon atoms, monovalent aryl or substituted aryl radicals having 6–15 carbon atoms, divalent alkyl or poly(alkylene oxide) radicals having 2–12 carbon atoms, a mixed alkyl-aryl radical having 6–35 carbon atoms, pentaerythritol, or halogenated substituents thereof. More preferably the sterically hindered phosphorus containing stabilizer comprises mixtures of one or more tris organically substituted phosphorus ester phosphites or phosphoric ester phosphates of the general structure $(RO)_3$—P or $(RO)_3$—P=O in which R may be the same or different and can be selected from the group comprising pentaerythritol, 2,2'-ethylidene-bis(4,6-di-t-butylphenyl) diester, or 2,4-di-tertiary-butylphenyl ester. Even more preferable the sterically hindered phosphorus containing stabilizer comprises mixtures of one or more of the following: bis(2,4-ditertiary-butylphenyl) pentaerythritol diphosphite, 2,2'-ethylidene-bis (4,6-di-t-butyl phenyl) fluorophosphite, or tris(2,4-di-tertiary-butylphenyl) phosphite. Most preferably the sterically hindered phosphorus containing stabilizer comprises mixtures containing tris(2,4-di-tertiary-butylphenyl)phosphite.

The combined effect of the multi-component system attains a combination of properties unexpected to those skilled in the art. As one embodiment, such a multi-component system is a resin composition comprising an effective stabilizing mixture of 1) phosphorous acid, and 2) tris-(nonylphenyl)phosphite, and optionally 3) tris(2,4-di-tertiary-butylphenyl) phosphite. When a thermoplastic polymer is treated with the composition of the invention a multicomponent resin results thereby, said resin composition comprising an effective stabilizing mixture of 1) a phosphorus containing acid, preferably phosphorous or phosphoric acid, and 2) a tri-ester of a phosphorus containing acid, preferably tris(nonylphenyl)phosphite, and optionally 3) a hindered tri-ester of a phosphorus containing acid, preferably tris(2,4-di-tertbutylphenyl) phosphite, in which the resin is a thermoplastic polymer, preferably a polycarbonate. More preferably such a multicomponent system is a resin composition comprising an effective stabilizing mixture comprising 1) 0.5 ppb to 0.1 phr (parts by weight per hundred parts by weight of resin) of phosphoric or phosphorous acid and 2) 3.5 ppb to 0.7 phr of tris(nonylphenyl) phosphite and optionally 3) 0.0001 phr to 0.2 phr tris(2,4-di-tertbutylphenyl) phosphite, in which the resin is comprised primarily of a polycarbonate. Even more preferably, such a multicomponent system is a resin composition comprising an effective stabilizing mixture of 1) 0.0004 phr to 0.008 phr of phosphoric acid or phosphorus acid and 2) 0.0025 to 0.05 phr tris(nonylphenyl)phosphite and optionally 3) 0.005 phr to 0.1 phr tris(2,4-di-tertbutylphenyl)phosphite, in which the resin is comprised primarily of a polycarbonate. More preferably, such a multicomponent system is a resin composition comprising an effective stabilizing mixture of 1) 0.0008 phr to 0.003 phr phosphoric acid or phosphorous acid and 2) 0.005 phr to 0.02 phr tris(nonylphenyl) phosphite, and optionally 3) 0.01 to 0.05 phr tris(2,4-di-tertbutylphenyl)phosphite, in which the resin is comprised primarily of a polycarbonate.

This combination of stabilizers attains a combination of properties that were totally unexpected and in fact, were previously thought to be non-desirable combinations of stabilizers. When used in combination, these stabilizers, a phosphorus containing oxy-acid and an unhindered phosphite, serve this purpose when used in small amounts. It is known by those skilled in the art that when used individually, these stabilizers can give undesirable side effects such as loss of hydrolytic stability or viscosity degradation of the resin. When used together in the amounts described in this invention such side effects are not observed. Hindered phosphites may serve as thermal stabilizers but as demonstrated herein are ineffective when undesirable species are present. Thus, hindered phosphites used with the combination of the present invention provide an unexpected improvement, that improvement being the loss or suppression of undesirable side effects.

Generally stated the thermoplastic polymer resin is preferably selected from an aromatic polycarbonate, a polyester carbonate, an aromatic dihydric phenyl sulfone carbonate, polycarbonate-siloxane copolymer, or mixtures thereof. The aromatic polycarbonate consist of the general formula,

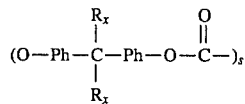

where $R_x$ is selected from the same or different $C_{(1-10)}$ alkyl group as cyclic alkyl group, s is a large number indicative of polymerization. Preferably the aromatic polycarbonate consist of bisphenol-A (2,2-bis(4-hydroxyphenyl)propane) polycarbonate having an absolute weight average molecular weight of about 10K to about 180K. The aromatic polycarbonate may consist of other polyfunctional compounds which are employed in branched polymers and contain at least three functional groups for branching. The preferred polyfunctional aromatic compounds employed in the randomly branched polycarbonates are 1,1,1-tris-(4-hydroxyphenyl)ethane, trimellitic anhydride as trimellitic acid. The aromatic polycarbonate may include substituted bisphenol groups such as brominated bisphenol-A or copolymers or blends thereof. The aromatic polycarbonate may include copolymers of aromatic or aliphatic dicarboxylic acids or blends of the dicarboxylic acid polyester. Although any aromatic dicarboxylic acid polyester copolymer can be used, the preferred are copolymers containing terephthalic acid and isophthalic acid copolymerized with Bisphenol-A. Although any aliphatic dicarboxylic acid polyester copolymer can be used, the preferred are copolymers containing 1,12-dodecanedicarboxylic acid or adipic acid and Bisphenol-A. Polycarbonate siloxane copolymers can be used, the preferred being a copolymer between Bisphenol-A and a phenolic terminated polydiorgano siloxane, such as a euginol terminated poly dimethylsiloxane. The most preferable aromatic polycarbonate is bisphenol-A polycarbonate. The polycarbonate may be manufactured by several processes including: 1) interfacial solution polymerization including bischloroformate polymerization or 2) melt condensation polymerization also known as transesterification. The resin composition mixtures described herein may contain and be used in conjunction with other additives and compositions recognized by those skilled in the art. These additives and compositions include amounts of flame retarding agents, reinforcing fillers non-phosphorus containing thermal as processing stabilizers comprising of hindered phenols, thio esters, thio ethers, epoxides, mold releases, non-phosphorus containing non-thermal stabilizers which comprise light stabilizers, ultra violet stabilizers, weathering stabilizers, color stabilizers, and gamma radiation stabilizers. Included are effective amounts of impact modifiers, processing aids, colorant and opacifiers. Included are effective amounts of surface effective agent, which comprise release agents, wear agents, low glass agents, adhesion promoters and mixtures thereof. The resin compositions described in this invention include articles extruded from, molded from, heat formed from, or solvent cast from the described composition and may be utilized for many applications, as would be recognized by those skilled in the art.

EXPERIMENTAL

The following examples are meant to be illustrative of the invention without suggesting any limitations on the scope thereof. The experimental procedures are disclosed for the purpose of further enabling the practice of the invention as a supplement to the discussion in the detailed description of the invention to those skilled in the art.

Experimental Procedure P-1: Preparation of the Bisphenol-A Disodium salt:

In a 5L 3-necked flask, equipped with a mechanical stirrer, Dean-Stark trap and condenser (with a nitrogen bubbler at the reflux end) assembly, and a thermometer were placed 228.29 g (1.000 mole) of bisphenol-A and 400 ml of deoxygenated water. This slurry was kept under nitrogen atmosphere for the complete preparation. To this slurry was added two 1.000M Acculute concentrates (80.000 g NaOH, 2.000 moles); the Acculute containers were rinsed with a total of 300 ml of deoxygenated water and added to the reaction mixture. The mixture was warmed to about 50° C. to complete dissolution. Toluene (1000 ml) was added and the mixture heated to reflux and the water removed via the Dean-Stark trap. Periodically the sides of the flask were scraped to loosen caked salt. When no more water was collected and the salt was a fine homogeneous powder, the mixture was cooled and taken to a glove box. The salt was isolated by filtration in the glove box (nitrogen atmosphere)

and any remaining toluene removed in vacuo. Yield was quantitative of the white disodium-BPA salt Experimental Procedure P-2: Preparation of the Disodium-BPA solution:

A solution of 1.90 g of dry disodium-BPA salt, as prepared in experimental procedure P-1, was added to a 1000 ml volumetric flask and methanol was added to the mark to dissolve the salt.

Experimental Procedure P-3: Preparation of the Resin-Disodium BPA Concentrate:

To 200 g of polycarbonate powder in a 2 l flask was added 200 ml of disodium-BPA solution, as prepared in Experimental Procedure P-2, (described above), and 300 mls of reagent grade methanol. The resulting slurry was placed on the rotary evaporator and the methanol removed using heat and vacuum. The resulting powder was then placed in an oven at 85° C. to dry for 18 hours.

Experimental Procedure P-4: Preparation of 2 ppm Na Spiked Resin (Master Batch):

Typical preparation: Into 53 Kg of polycarbonate powder (I.V.=0.53) was added 329 g of resin-disodium-BPA concentrate, as prepared in Experimental Procedure P-3. The resulting mixture was mixed thoroughly in a Henschel Mixer. This gave a 1.97 ppm Na resin master batch.

Experimental Procedure P-5: Preparation of a 2.0% TNPP/Phosphorous acid Concentrate:

Into 980 g of polycarbonate resin powder (I.V.=0.53) was added 2.0 ml of 45% phosphorous acid and 18.9 ml of trisnonylphenyl phosphite. The mixture was blended thoroughly using a high speed Harbill paint mixer. The mixture was stored in a glass container with a moisture resistant lid.

Experimental Procedure P-6: Preparation of a 2.0% TNPP Concentrate:

To 98 g of polycarbonate resin powder (I.V.=0.53) was added 2.0 g of hot tris-nonylphenyl phosphite. The mixture was blended thoroughly using a high speed Harbill paint mixer. This mixture was not stored for long periods but used fresh and was stored in moisture resistant containers.

Experimental Procedure P-7: Preparation of DNPP:

Into 75 g of tris(nonylphenyl) phosphite (TNPP, CAS#26523-78-4) was added 4.47 g of solid anhydrous phosphorous acid. One drop of water was added and the mixture was stirred at 120° C. for 1 hr. There was an exotherm. The product is stored under an anhydrous atmosphere.

Experimental Procedure P-8: Preparation of a DNPP Concentrate:

Into 980 g of polycarbonate resin powder (I.V.=0.53) was added 20 g of DNPP (bis-nonylphenyl phosphite). The mixture was blended thoroughly using a high speed Harbill paint mixer. The mixture was stored in a glass container with a moisture resistant lid.

Experimental Procedure P-9: Preparation of a TNPP/Phosphoric Acid Concentrate:

Into 980 g of polycarbonate resin powder (I.V.=0.53) was added 0.92 ml of 85% phosphoric acid and 18.9 ml of tris-nonylphenyl phosphite. The mixture was blended thoroughly using a high speed Harbill paint mixer. The mixture was stored in a glass container with a moisture resistant lid.

Experimental Procedure P-10: Preparation of Comparative Example 1:

3.0 Kg of 2 ppm Na spiked resin, from experimental procedure P-4, was extruded and chopped into pellets. A 30 mm (L/D=29/1) Werner-Pfleiderer twin screw extruder was used at 300 rpm and 300° C. with the use of vacuum venting. The resulting pellets were molded into 2 in×3 in×⅛ in plaques on a 15 ton Boy injection molding machine using a 1 min cycle time at 640F for base conditions and a 6 min cycle time at 640F as abusive conditions. Color (YI) was measured on a Pacific Scientific Gardner Laboratory XL-835 instrument.

Experimental Procedure P-11: Preparation of Example 1:

Into 3.0 Kg of 2 ppm Na spiked resin, from experimental procedure P-4, was added 15.0 g of TNPP/Phosphorous acid concentrate, from experimental procedure P-4. The mixture was blended thoroughly using a high speed Harbill paint mixer and then extruded and chopped into pellets. A 30 mm (L/D=29/1) Werner-Pfleiderer twin screw extruder was used at 300 rpm and 300° C. with vacuum venting. The resulting pellets were molded into 2 in×3 in×⅛ in plaques on a 15 ton Boy injection molding machine using a 1 min cycle time at 640F for base conditions and a 6 min cycle time at 640F as abusive conditions. Color (YI) was measured on a Pacific Scientific Gardner Laboratory XL-835 instrument.

Experimental Procedure P-12: Preparation of Example 16:

Into 3.0 Kg of 2 ppm Na spiked resin, from experimental procedure P-4, was added 15.0 g of TNPP/Phosphoric acid concentrate, from experimental procedure P-9 and 0.90 g of tris (2,4-di-t-butylphenyl) phosphite. The mixture was blended thoroughly using a high speed Harbill paint mixer and then extruded and chopped into pellets. A 30mm (L/D= 29/1) Werner-Pfleiderer twin screw extruder was used at 300 rpm and 300° C. with vacuum venting. The resulting pellets were molded into 2 in×3 in×⅛ in plaques on a 15 ton Boy injection molding machine using a 1 min cycle time at 640F for base conditions and a 6 min cycle time at 640F as abusive conditions. Color (YI) was measured on a Pacific Scientific Gardner Laboratory XL-835 instrument Experimental Procedure P-13: Preparation of Examples 1 to 36 and Comparative Examples 1 to 12:

Examples 1 to 24 were formulated, extruded and tested in similar fashion to examples 1 and 16, as described in experimental procedures P-11 and P-12, respectively. Comparative examples 1 to 24 were formulated and tested in similar fashion to comparative example 1, as described in experimental procedure P-10. Examples 1 to 24 and comparative samples 1 to 24 are all based upon 100 phr of polycarbonate with 2 ppm of di-sodium BPA added to produce a reproducibly unstable material.

Identification of samples used in examples or comparative examples:

A=amount of phosphorous acid and tris(nonylphenyl) phosphite in a 1:2 mole ratio in ppm, delivered via a concentrate, which was prepared as described in experimental procedure P-6.

B=amount of phosphoric acid and tris(nonylphenyl) phosphite in a 1:2 mole ratio in ppm, delivered via a concentrate, which was prepared as described in experimental procedure P-9.

C=amount of di(nonylphenyl) phosphite in ppm, delivered via a concentrate, which is prepared as described in experimental procedure P-7.

D=amount of tris(2,4-ditertiary-butylphenyl) phosphite in ppm or phr, commercially available as Irgafos 168®.

E=para-cumylphenol end capped resin of I.V.=0.53 from interfacial process.

F=phenol end capped resin of I.V.=0.53 from interfacial process.

G=para-cumylphenol end capped resin of I.V.=0.53 from chloroformate process.

H=para-cumylphenol end capped resin of I.V.=0.35 from the chloroformate process.

I=para-cumylphenol end capped resin of I.V.=0.35 from the interfacial process.

J1=is a mixture comprised of the following mole % amounts: 76.9% potassium diphenylsulfone-3-sulfonate (KSS), 20.5 % dipotassium diphenylsulfone-3, 3'-disulfonate, and 2.6% diphenylsulfone. (Mole ratios via HPLC analysis).

J2=is a mixture comprised of the following mole % amounts: 87.3% potassium diphenylsulfone-3-sulfonate (KSS), 12.4 % dipotassium diphenylsulfone-3, 3'-disulfonate, and 0.3% diphenylsulfone. (Mole ratios via HPLC analysis).

K=Phenol endcapped polycarbonate of IV=0.35 from a melt resin process with 60–70% of the chain ends capped.

L=Phenol endcapped polycarbonate of W=0.48 from a melt resin process with 60–70% of the chain ends capped.

M=amount of tris(nonylphenyl) phosphite, delivered via a concentrate, which is prepared as described in experimental procedure P-27.

N=amount of phosphorous acid, delivered via a solution, which is prepared as described in experimental procedure P-25.

O=amount of phosphoric acid, delivered via a solution, which is prepared as described in experimental procedure P-26.

P=Amount of phosphorous acid and tris(nonylphenyl) phosphite in a 1:2 mole ratio, delivered via a concentrate, which is prepared as described in experimental procedure P-30.

Q=Stabilization system used.

R=Methylmethacrylate butadiene styrene copolymer core shell impact modifier, available commercially as Kane Ace B-56, from Kaneka-Fuji.

S=An all acrylic core sheet impact modifier, available commercially as Acryloid KM-330, from Rohm & Haas.

T=A polycarbonate siloxane block copolymer, available commercially as Copel Resin from GE Plastics, CAS #68440-77-8.

U=An ethylene-ethyl acrylate copolymer, available commercially as DPD 6169, from Union Carbide, CAS #9010-86-0.

V=A polycarbonate siloxane block copolymer containing 20% siloxane content with an eugenol termination and an average block length of 50 siloxane units.

W=A linear low density polyethylene, available commercially as Escorene LL-1001.09, from Exxon.

X=A UV light stabilizer, available commercially as Cyasorb UV-5411, from American Cyanamid.

Y=A UV light stabilizer, available commercially as Tinuvin 234, from Ciba-Geigy.

Z=Phosphorous Acid solution: Into 100 ml of acetonitrile was dissolved 0.01328 g of phosphorous acid, 100 μl of this solution into 1 g of reaction mixture delivers 0.367 mole of phosphorous for every mole of Na at the 10 ppm concentration of Na.

AA=Phosphoric Acid solution: Into 100 ml of acetonitrile was dissolved 0.01588 g of phosphoric acid, 100 μl of this solution into 1 g of reaction mixture delivers 0.367 mole of phosphorous for every mole of Na at the 10 ppm concentration of Na.

AB=TNPP solution #2: Into 100 ml of methylene chloride was dissolved 0.234 g of TNPP, 100 μl of this solution into 1 g of reaction mixture delivers 0.733 mole of phosphorous for every mole of Na at the 10 ppm concentration of Na.

AC=TNPP solution #1: Into 100 ml of methylene chloride was dissolved 0.298 g of TNPP, 100 μl of this solution into 1 g of reaction mixture delivers 1 mole of TNPP for every mole of Na at the 10 ppm concentration of Na.

AD=tris(2,4-ditertiary-butylphenyl) phosphite solution Into 100 ml of methylene chloride was dissolved 0.280 g of tris(2,4-ditertiary-butylphenyl) phosphite, 100 μl of this solution into 1 g of reaction mixture delivers 1 mole of tris(2,4-ditertiary-butylphenyl) phosphite for every mole of Na at the 10 ppm concentration of Na.

Preliminary Explanation of Tables 1, 2, and 3

Tables 1, 2, and 3 are similar insofar as they demonstrate the results of designed experiments whose purpose is to evaluate primary and secondary effects between known phosphite stabilizers and the stabilizing combination of the instant invention. Tris(2,4-ditertiary-butylphenyl) phosphite has been selected as one of the best comparative examples to use as a comparison between known phosphite stabilizers and the combination of the instant invention. Di-nonylphenyl phosphite, DNPP, is an example of a phosphite stabilizer that produces benefits at much lower concentrations than tris(2,4-ditertiary-butylphenyl) phosphite. Thus the comparisons made in Tables 1, 2, and 3 demonstrate the advantages of the instant invention over phosphite stabilizers that are effective in the parts per thousand range or over phosphite stabilizers that are effective in the parts per billion to parts per million range. Tables 1, 2, and 3 are arranged so that direct line to line comparisons may be made among the delta YI's in each table, demonstrating by means of those comparisons that the instant invention dramatically reduces color generation during extended cycle abusive molding.

Description of Table 1

Examples 1 to 12 and comparative examples 1 to 4 were run with a pre-blended masterbatch of polycarbonate powder and di-sodium BPA, with all extrusion, molding, and testing taking place at the same time with the same equipment.

TABLE 1

A Design of Experiments Contrasting the Invention Using the Phosphorous Acid Embodiment with Classical Stabilization

| | A ppm | B ppm | C ppm | D phr | AVE YI 1 min | AVE YI 6 min | Delta YI |
|---|---|---|---|---|---|---|---|
| comparative example 1 | 0 | 0 | 0 | 0 | 4.27 | 19.27 | 15.00 |
| example 1 | 100 | 0 | 0 | 0 | 2.69 | 3.45 | 0.75 |
| example 2 | 200 | 0 | 0 | 0 | 2.45 | 3.49 | 1.04 |
| example 3 | 300 | 0 | 0 | 0 | 2.36 | 3.80 | 1.44 |
| comparative example 2 | 0 | 0 | 0 | 0.03 | 3.04 | 9.59 | 6.55 |
| example 4 | 100 | 0 | 0 | 0.03 | 2.40 | 3.04 | 0.64 |
| example 5 | 200 | 0 | 0 | 0.03 | 2.32 | 3.19 | 0.87 |
| example 6 | 300 | 0 | 0 | 0.03 | 2.33 | 3.22 | 0.89 |
| comparative example 3 | 0 | 0 | 0 | 0.06 | 2.63 | 9.96 | 7.33 |
| example 7 | 100 | 0 | 0 | 0.06 | 2.17 | 3.04 | 0.86 |
| example 8 | 200 | 0 | 0 | 0.06 | 2.34 | 3.12 | 0.77 |
| example 9 | 300 | 0 | 0 | 0.06 | 2.20 | 3.04 | 0.84 |
| comparative example 4 | 0 | 0 | 0 | 0.09 | 2.46 | 9.49 | 7.03 |
| example 10 | 100 | 0 | 0 | 0.09 | 2.20 | 2.92 | 0.72 |
| example 11 | 200 | 0 | 0 | 0.09 | 2.09 | 2.99 | 0.91 |
| example 12 | 300 | 0 | 0 | 0.09 | 2.14 | 3.17 | 1.03 |

Interpretation of Table 1

The data demonstrate one embodiment of the instant invention, the addition of small quantities of phosphorous acid and TNPP (tris(nonylphenyl)phosphite) and document the improvement in the resistance to yellowing both with and without the addition of progressively larger quantities of a conventional stabilizer, tris(2,4-di-tertiarybutylphenyl)phosphite.

Description of Table 2

Examples 13 to 24 and comparative examples 5 to 8 were run with a pre-blended masterbatch of polycarbonate powder and di-sodium BPA, with all extrusion, molding, and testing taking place at the same time with the same equipment.

TABLE 2

A Design of Experiments Contrasting the Invention Using the Phosphoric Acid Embodiment with Classical Stabilization

| | A ppm | B ppm | C ppm | D phr | AVE YI 1 min | AVE YI 6 min | Delta YI |
|---|---|---|---|---|---|---|---|
| comparative example 5 | 0 | 0 | 0 | 0 | 2.79 | 10.12 | 7.33 |
| example 13 | 0 | 100 | 0 | 0 | 2.72 | 3.66 | 0.94 |
| example 14 | 0 | 200 | 0 | 0 | 2.99 | 4.02 | 1.02 |
| example 15 | 0 | 300 | 0 | 0 | 2.68 | 3.79 | 1.11 |
| comparative example 6 | 0 | 0 | 0 | 0.03 | 2.57 | 9.25 | 6.68 |
| example 16 | 0 | 100 | 0 | 0.03 | 2.24 | 3.34 | 1.09 |
| example 17 | 0 | 200 | 0 | 0.03 | 2.35 | 3.82 | 1.48 |
| example 18 | 0 | 300 | 0 | 0.03 | 2.29 | 3.62 | 1.34 |
| comparative example 7 | 0 | 0 | 0 | 0.06 | 2.41 | 8.89 | 6.48 |
| example 19 | 0 | 100 | 0 | 0.06 | 2.16 | 3.05 | 0.89 |
| example 20 | 0 | 200 | 0 | 0.06 | 2.06 | 3.37 | 1.30 |
| example 21 | 0 | 300 | 0 | 0.06 | 2.17 | 3.23 | 1.07 |
| comparative example 8 | 0 | 0 | 0 | 0.09 | 2.33 | 10.40 | 8.07 |
| example 22 | 0 | 100 | 0 | 0.09 | 2.03 | 3.09 | 1.06 |
| example 23 | 0 | 200 | 0 | 0.09 | 2.09 | 3.14 | 1.06 |
| example 24 | 0 | 300 | 0 | 0.09 | 2.08 | 3.03 | 0.95 |

Interpretation of Table 2

The data demonstrate one embodiment of the instant invention, the addition of small quantities of phosphoric acid and TNPP (tris(nonylphenyl)phosphite) and document the improvement in the resistance to yellowing both with and without the addition of progressively larger quantities of a conventional stabilizer, tris(2,4-di-tertiarybutylphenyl)phosphite.

Description of Table 3

Comparative examples 9 to 24 were run with a pre-blended masterbatch of polycarbonate powder and di-sodium BPA, with all extrusion, molding, and testing taking place at the same time with the same equipment.

TABLE 3

Comparative Examples of DNPP with Classical Stabilization on Color Change in Polycarbonate

| | A ppm | B ppm | C ppm | D phr | AVE YI 1 min | AVE YI 6 min | Delta YI |
|---|---|---|---|---|---|---|---|
| comparative example 9 | 0 | 0 | 0 | 0 | 3.83 | 14.21 | 10.38 |
| comparative example 10 | 0 | 0 | 100 | 0 | 3.20 | 4.64 | 1.44 |
| comparative example 11 | 0 | 0 | 200 | 0 | 2.97 | 3.94 | 0.97 |
| comparative example 12 | 0 | 0 | 300 | 0 | 2.66 | 4.05 | 1.39 |
| comparative example 13 | 0 | 0 | 0 | 0.03 | 2.99 | 8.12 | 5.13 |
| comparative example 14 | 0 | 0 | 100 | 0.03 | 2.49 | 4.25 | 1.76 |
| comparative example 15 | 0 | 0 | 200 | 0.03 | 2.47 | 3.69 | 1.23 |
| comparative example 16 | 0 | 0 | 300 | 0.03 | 2.31 | 3.89 | 1.58 |
| comparative example 17 | 0 | 0 | 0 | 0.06 | 2.72 | 8.51 | 5.79 |
| comparative example 18 | 0 | 0 | 100 | 0.06 | 3.01 | 4.44 | 1.43 |
| comparative example 19 | 0 | 0 | 200 | 0.06 | 2.06 | 3.40 | 1.34 |
| comparative example 20 | 0 | 0 | 300 | 0.06 | 1.98 | 3.57 | 1.59 |
| comparative example 21 | 0 | 0 | 0 | 0.09 | 2.62 | 9.72 | 7.10 |
| comparative example 22 | 0 | 0 | 100 | 0.09 | 1.90 | 3.19 | 1.29 |
| comparative example 23 | 0 | 0 | 200 | 0.09 | 1.88 | 3.34 | 1.46 |
| comparative example 24 | 0 | 0 | 300 | 0.09 | 1.88 | 3.58 | 1.70 |

Interpretation of Table 3

These data provide a prior art comparison between the embodiments of the invention in Tables 1 and 2, comparing the addition of a small quantity of DNPP (di(nonylphenyl)phosphite) without the addition of a small quantity of acid, both with and without the addition of progressively larger quantities of a conventional stabilizer, tris(2,4-di-tertiarybutylphenyl)phosphite. By comparison to the Delta YI values in Tables 1 and 2 versus those presented in Table 3, the improvement in color stability under abusive processing conditions rendered by two of the embodiments of the instant invention is readily seen.

Experimental Procedure P-14: Preparation of the Solvent Green 3 comparative Example 30 experiment:

Into 3.0 KG of paracumylphenol endcapped bisphenol-A polycarbonate powder of nominal 0.53 I.V. was added 6.90 g of Solvent Green 3. The mixture was blended thoroughly using a high speed Harbill paint mixer. The mixture was extruded and chopped into pellets. A 1.75 inch (L/D=24/1) Sterling single screw extruder set at 500° F. was used. The resulting pellets were molded into 2 in×3 in×⅛ in plaques on a 15 ton Boy injection molding machine at 640° F. for both a 1 minute and 6 minute cycle time. Sufficient samples were discarded until equilibrium color was obtained, with a minimum of 3 samples discarded in all cases. Eight samples of each were retained. Color was measured on an ACS Chroma-Sensor CS-5 recording color space as Hunter Lab numbers. The ΔE was calculated as the vectorial distance in orthogonal Lab color space between the samples molded for a 6 minute cycle time as compared to the samples molded for a 1 minute cycle time, using the average Lab color readings. $\Delta E = ((L_1-L_6)^2+(a_1-a_6)^2+(b_1-b_6)^2)^{1/2}$, where 1 refers to the average reading for the eight samples molded at a 1 minute cycle time and 6 refers to the average reading for the eight samples molded at a 6 minute cycle time.

Experimental Procedure P-15: Preparation of the Solvent Green 3 example 30 Experiment:

Into 3.0 KG of paracumylphenol endcapped bisphenol-A polycarbonate powder of nominal 0.53 I.V. was added 6.90 g of Solvent Green 3 and 12.0 g of the 2% TNPP phosphorous acid concentrate (prepared above). The mixture was blended thoroughly using a high speed Harbill paint mixer. The mixture was extruded and chopped into pellets. A 1.75 inch (L/D=24/1) Sterling single screw extruder at 500F was used. The resulting pellets were molded into 2 in×3 in×⅛ in plaques on a 15 ton Boy injection molding machine at 640° F. for both a 1 minute and 6 minute cycle time. Sufficient samples were discarded until equilibrium color was obtained, with a minimum of 3 samples discarded in all cases. Color was measured on an ACS Chroma-Sensor CS-5 recording color space as Hunter Lab numbers. The ΔE was calculated as the vectorial distance in orthogonal Lab color space between the samples molded for a 6 minute cycle time as compared to the samples molded for a 1 minute cycle time, using the average Lab color readings. $\Delta E = ((L^1 - L_6)^2 + (a_1 - a_6)^2 + (b_1 - b_6)^2)^{1/2}$, where 1 refers to the average reading for the eight samples molded at a 1 minute cycle time and 6 refers to the average reading for the eight samples molded at a 6 minute cycle time.

Experimental Procedure P-16: Solvent Green 3 Comparisons:

The difference between the Solvent Green 3 example 30 experiment and the Solvent Green 3 comparative example 30 experiment is shown in the last column in Table 4. In this example all of the results were within experimental error and no differences were observed.

Explanation of Table 4:

Table 4 summarizes the results of evaluations on a wide variety of commercially available polycarbonate colorants using the instant invention. Colorants are identified by both Chemical Abstracts Service numbers (CAS#) as well as their common names. Colorant loadings are given in grams of colorant per Kg of bisphenol-A polycarbonate. A is the amount of phosphorous acid and tris(nonylphenyl) phosphite used, in a 1:2 mole ratio in ppm. All samples were prepared and analyzed using methods similar to those described in Experimental Procedures P-14, P-15, and P-16.

TABLE 4

Effect of the Invention on Polycarbonate - Colorant Combinations

|  | Colorant CAS # | Colorant Name | Colorant Loading g/Kg | ΔE | A | Sig |
|---|---|---|---|---|---|---|
| comp. ex. 25 | 13463-67-7 | Pig-Wht-6 | 2.0 | 0.87 | 0 | |
| example 25 | 13463-67-7 | Pig-Wht-6 | 2.0 | 0.99 | 80 | same |
| comp. ex. 26 | 1333-86-4 | Channel Black | 3.0 | 0.14 | 0 | |
| example 26 | 1333-86-4 | Channel Black | 3.0 | 0.21 | 80 | same |
| comp. ex. 27 | 1333-86-4 | Pig-Blk-7 | 3.0 | 0.02 | 0 | |
| example 27 | 1333-86-4 | Pig-Blk-7 | 3.0 | 0.02 | 80 | same |
| comp. ex. 28 | 68187-11-1 | Pig-Blk-7 | 8.0 | 0.17 | 0 | |
| example 28 | 68187-11-1 | Pig-Blk-7 | 8.0 | 0.20 | 80 | same |
| comp. ex. 29 | 68186-85-6 | Pig-Grn-50 | 8.0 | 2.14 | 0 | |
| example 29 | 68186-85-6 | Pig-Grn-50 | 8.0 | 2.18 | 80 | same |
| comp. ex. 30 | 128-80-3 | Sol-Grn-3 | 2.3 | 0.07 | 0 | |
| example 30 | 128-80-3 | Sol-Grn-3 | 2.3 | 0.05 | 80 | same |
| comp. ex. 31 | 1328-53-6 | Pig-Grn-7 | 5.0 | 0.38 | 0 | |
| example 31 | 1328-53-6 | Pig-Grn-7 | 5.0 | 0.41 | 80 | same |
| comp. ex. 32 | 14302-13-7 | Pig-Grn-36 | 5.0 | 0.33 | 0 | |
| example 32 | 14302-13-7 | Pig-Grn-36 | 5.0 | 0.44 | 80 | same |
| comp. ex. 33 | 4851-50-7 | Sol-Grn-28 | 0.031 | 35.64 | 0 | |
| example 33 | 4851-50-7 | Sol-Grn-28 | 0.031 | 2.98 | 80 | better |
| comp. ex. 34 | 1309-37-1 | Pig-Red-101 | 8.0 | 1.13 | 0 | |
| example 34 | 1309-37-1 | Pig-Red-101 | 8.0 | 0.98 | 80 | same |
| comp. ex. 35 | 81-329-0 | Sol-Red-52 | 0.034 | 24.17 | 0 | |
| example 35 | 81-329-0 | Sol-Red-52 | 0.034 | 7.09 | 80 | better |
| comp. ex. 36 | 1309-37-1 | Pig-Red-101 | 6.0 | 4.26 | 0 | |
| example 36 | 1309-37-1 | Pig-Red-101 | 6.0 | 3.44 | 80 | better |
| comp. ex. 37 | 1309-37-1 | Pig-Red-101 | 0.80 | 0.94 | 0 | |
| example 37 | 1309-37-1 | Pig-Red-101 | 0.80 | 0.61 | 80 | better |
| comp. ex. 38 | 71902-17-5 | Sol-Red-135 | 6.0 | 0.48 | 0 | |
| example 38 | 71902-17-5 | Sol-Red-135 | 6.0 | 0.87 | 80 | same |
| comp. ex. 39 | 15958-68-6 | Sol-Red-207 | 4.0 | 29.00 | 0 | |
| example 39 | 15958-68-6 | Sol-Red-207 | 4.0 | 25.47 | 80 | better |
| comp. ex. 40 | 12769-96-9 | Pig-Vlt-15 | 5.0 | 5.58 | 0 | |
| example 40 | 12769-96-9 | Pig-Vlt-15 | 5.0 | 4.58 | 80 | same |
| comp. ex. 41 | 81-48-1 | Sol-Vlt-13 | 2.0 | 0.15 | 0 | |
| example 41 | 81-48-1 | Sol-Vlt-13 | 2.0 | 0.20 | 80 | same |
| comp. ex. 42 | 147-14-8 | Pig-Blu-15:4 | 2.0 | 0.97 | 0 | |
| example 42 | 147-14-8 | Pig-Blu-15:4 | 2.0 | 0.51 | 80 | better |
| comp. ex. 43 | 8005-40-1 | Sol-Vlt-36 | 2.4 | 0.31 | 0 | |
| example 43 | 8005-40-1 | Sol-Vlt-36 | 2.4 | 0.55 | 80 | same |
| comp. ex. 44 | 57455-37-5 | Pig-Blu-29 | 10.0 | 7.91 | 0 | |
| example 44 | 57455-37-5 | Pig-Blu-29 | 10.0 | 7.86 | 80 | same |
| comp. ex. 45 | 32724-62-2 | Sol-Blu-97 | 4.0 | 0.09 | 0 | |
| example 45 | 32724-62-2 | Sol-Blu-97 | 4.0 | 0.07 | 80 | same |
| comp. ex. 46 | 6737-68-4 | Sol-Blu-101 | 5.0 | 0.09 | 0 | |
| example 46 | 6737-68-4 | Sol-Blu-101 | 5.0 | 0.09 | 80 | same |
| comp. ex. 47 | 25632-28-4 | Diaresin Blue H3G | 5.0 | 0.67 | 0 | |

TABLE 4-continued

Effect of the Invention on Polycarbonate - Colorant Combinations

|  | Colorant CAS # | Colorant Name | Colorant Loading g/Kg | ΔE | A | Sig |
|---|---|---|---|---|---|---|
| example 47 | 25632-28-4 | Diaresin Blue H3G | 5.0 | 0.04 | 80 | better |
| comp. ex. 48 | 1345-16-0 | Pig-Blu-28 | 6.0 | 3.92 | 0 | |
| example 48 | 1345-16-0 | Pig-Blu-28 | 6.0 | 3.57 | 80 | same |
| comp. ex. 49 | 68187-11-1 | Pig-Blu-28 | 6.0 | 1.44 | 0 | |
| example 49 | 68187-11-1 | Pig-Blu-28 | 6.0 | 0.91 | 80 | better |
| comp. ex. 50 | 68186-90-3 | Pig-Brn-24 | 10.0 | 1.49 | 0 | |
| example 50 | 68186-90-3 | Pig-Brn-24 | 10.0 | 0.82 | 80 | better |
| comp. ex. 51 | 71077-18-4 | Pig-Yel-53 | 7.35 | 1.17 | 0 | |
| example 51 | 71077-18-4 | Pig-Yel-53 | 7.35 | 0.24 | 80 | better |
| comp. ex. 52 | 35773-43-4 | Sol-Yel-160:1 | 2.0 | 0.51 | 0 | |
| example 52 | 35773-43-4 | Sol-Yel-160:1 | 2.0 | 0.29 | 80 | better |
| comp. ex. 53 | 6925-69-5 | Sol-Org-60 | 5.0 | 0.27 | 0 | |
| example 53 | 6925-69-5 | Sol-Org-60 | 5.0 | 0.61 | 80 | same |
| comp. ex. 54 | 4174-09-8 | Sol-Yel-93 | 5.0 | 1.59 | 0 | |
| example 54 | 4174-09-8 | Sol-Yel-93 | 5.0 | 0.37 | 80 | better |
| comp. ex. 55 | 30125-47-4 | Pig-Yel-138 | 5.0 | 13.81 | 0 | |
| example 55 | 30125-47-4 | Pig-Yel-138 | 5.0 | 5.23 | 80 | better |
| comp. ex. 56 | 54079-53-7 | Disp-Yel-201 | 2.0 | 3.12 | 0 | |
| example 56 | 54079-53-7 | Disp-Yel-201 | 2.0 | 0.42 | 80 | better |
| comp. ex. 57 | 5718-26-3 | Disp-Org-47 | 0.022 | 16.33 | 0 | |
| example 57 | 5718-26-3 | Disp-Org-47 | 0.022 | 9.83 | 80 | better |

Interpretation of Table 4

In all cases the use of the instant invention shows either no deleterious effect or an improvement in the efficacy of the colorant when used with the colorants. This is of great significance since there are no deleterious effects observed. Normally stabilizers show advantages in some areas and disadvantages in other area. Those skilled in the art will realize the advantage of not observing deleterious effects when the instant invention is evaluated across a wide range of reactive colorants (cf. Procedure, P-16).

TABLE 5

The Effect of the Invention on Color Formation in Polycarbonates Having Different End Groups Produced by Different Polymerization Processes

|  | Resin Type | A (ppm) | YI 570° F. | YI 680° F. | YI 5 min Dwell 680° F. |
|---|---|---|---|---|---|
| Comparative Example 58 | E | 0 | 0.80 | 1.1 | 1.5** |
| Example 58 | E | 80 ppm | 0.70 | 0.90 | 2.3 |
| Comparative Example 59 | F | 0 | 1.2 | 2.3 | 7.9 |
| Example 59 | F | 80 ppm | 0.90 | 1.3 | 2.3 |
| Comparative Example 60 | G | 0 | 0.50 | 1.2 | 2.0 |
| Example 60 | G | 80 ppm | 0.50 | 0.70 | 1.4 |

**number is out of the ordinary-bad data point (note how 570° F. and 680° F. YIs are high)

TABLE 6

Effect of the Invention on the Viscosity Stability of Polycarbonate Having Different End Groups and Produced by Different Polymerization Processes

|  | Resin Type | A (ppm) | Initial Viscosity at 300° C. (poise) | Viscosity Change 300° C./30 min. (%) |
|---|---|---|---|---|
| Comp. ex. 58 | E | 0 | 8780 | −15 |
| Example 58 | E | 80 | 8600 | −6 |
| Comp. ex. 59 | F | 0 | 8000 | −9 |
| Example 59 | F | 80 | 8060 | −3 |
| Comp. ex. 60 | G | 0 | 9450 | −10 |
| Example 60 | G | 80 | 9450 | −5 |

Experimental Procedure P-17

Comparative Example 58 and Example 58:
Into 6.0 Kg of polycarbonate resin powder (para-cumylphenol end capped and 0.53 I.V. nominal) was added 3.60 g of tris(2,4-di-t-butylphenyl)phosphite, 9.0 g of pentaerythritoltetrasterate, 12.0 g of 2-(2H-benzotriazol-2-yl)-4-(1,1,3,3-tetramethylbutyl)-phenol, and 0.006 g of Solvent violet 13. The mixture was blended thoroughly using a high speed Harbill paint mixer. The batch was split into two 3 Kg portions. One was extruded and chopped into pellets to give comparative example 58. To the other 3 Kg portion was added 12.0 g of TNPP/PA concentrate (above). This mixture was blended in similar fashion, extruded, and chopped as Example 58. A 30 mm (L/D=29/1) Werner-Pfleiderer twin screw extruder at 300 rpm and 300° C. was used with vacuum venting. The resulting pellets were molded into 2 in ×3 in ×⅛ in plaques on a 15 ton Boy injection molding machine using a 35 s cycle time at 570F, a 35 s cycle time at 680F, and a 5 min. dwell at 680F. These conditions give base conditions and different levels of abusive conditions. Color (YI) was measured on a Pacific Scientific Gardner Laboratory XL-835 instrument. Other examples were formulated in similar fashion.

Explanation of Tables 5 & 6:

The beneficial effect of the invention is demonstrated for polycarbonates having different end groups and produced by different polymerization processes. These data demonstrate that the invention is effective for essentially all varieties of polycarbonates as to color and viscosity stability.

TABLE 7

Interaction of Classical Stabilization Systems with the Invention on Color Formation in Polycarbonates Having Different End Groups and Produced by Different Polymerization Processes

| | Resin Type | D (phr) | A (ppm) | YI @ 570° F. | YI @ 680° F. | YI 5 min. Dwell @ 680° F. |
|---|---|---|---|---|---|---|
| Comp. ex. 61 | H | 0.045 | 0 | 1.8 | 1.9 | 3.1 |
| Example 61 | H | 0.045 | 80 | 1.6 | 1.6 | 2.1 |
| Comp. ex. 62 | I | 0.045 | 0 | 1.5 | 1.5 | 2.3 |
| Example 62 | I | 0.045 | 80 | 1.3 | 1.4 | 1.7 |
| Comp. ex. 63 | H | 0 | 0 | 1.6 | 1.7 | 2.3 |
| Example 63 | H | 0 | 80 | 1.5 | 1.6 | 2.0 |

Explanation of Table 7:

The beneficial effect of the invention is independent of the resin end groups or the process used to produce the resin. This beneficial effect is more pronounced when the resin is subjected to severe or abusive processing conditions.

Experimental Procedure P-18: Comparative Example 61:

Into 2.0 Kg of polycarbonate resin powder (para-cumylphenol end capped and 0.35 I.V. nominal) was added 0.90 g of tris(2,4-di-t-butylphenyl)phosphite and 6.0 g of pentaerythritoltetrastearate. The mixture was blended thoroughly using a high speed Harbill paint mixer and then extruded and chopped into pellets to give comparative example 61. A 30 mm (L/D=29/1) Werner-Pfleiderer twin screw extruder at 300 rpm and 300° C. was used with vacuum venting. The resulting pellets were molded into 2 in×3 in×⅛ in plaques on a 15 ton Boy injection molding machine using a 35 s cycle time at 570F, a 35 s cycle time at 680F, and a 5 min. dwell at 680F. These conditions give base conditions and different levels of abusive conditions. Color (YI) was measured on a Pacific Scientific Gardner Laboratory XL-835 instrument.

Experimental Procedure P-19: Example 61:

Into 2.0 Kg of polycarbonate resin powder (para-cumylphenol end capped and 0.35 I.V. nominal) was added 0.90 g of tris(2,4-di-t-butylphenyl)phosphite, 6.0 g of pentaerythritoltetrasterate and 8.00 g of TNPP/PA concentrate (above). The mixture was blended thoroughly using a high speed Harbill paint mixer and then extruded and chopped into pellets to give example 61. A 30mm (L/D=29/1) Werner-Pfleiderer twin screw extruder at 300 rpm and 300° C. was used with vacuum venting. The resulting pellets were molded into 2 in×3 in×⅛ in plaques on a 15 ton Boy injection molding machine using a 35 s cycle time at 570F, a 35 s cycle time at 680F, and a 5 min. dwell at 680F. These conditions give base conditions and different levels of abusive conditions. Color (YI) was measured on a Pacific Scientific Gardner Laboratory XL-835 instrument.

TABLE 8

Effect of the Invention on the Viscosity Stability of Polycarbonate Compositions Containing Flame Retardants of Differing Purity

| | FR type | D (phr) | A (ppm) | Initial Viscosity @300° C. (poise) | Viscosity Change after 30 minutes @300° C. (%) |
|---|---|---|---|---|---|
| Comp. ex. 64 | — | 0 | 0 | 10000 | −14 |
| Comp. ex. 65 | J1 | 0.06 | 0 | 9700 | −26 |
| Example 64 | J1 | 0.06 | 80 | 9800 | −20 |
| Example 65 | J1 | 0.06 | 160 | 9600 | −14 |
| Comp. ex. 66 | J2 | 0.06 | 0 | 9700 | −19 |
| Example 66 | J2 | 0.06 | 80 | 9800 | −11 |
| Example 67 | J2 | 0.03 | 80 | 9800 | −11 |

Interpretation of Table 8:

Comparative example 64 shows the effect of the initial polymer base with no additives. In comparative example 65 the effect of adding flame retardant (FR) J1 is shown with a standard phosphite stabilization system. In examples 64 and 65 are shown the effects of adding increasing amounts of the instant invention of a 2:1 mole ratio of tris-(nonylphenyl) phosphite with phosphorous acid. The best material would be one in which there is no change in viscosity, or in which the viscosity change is 0%. It can be observed that adding increasing amounts of the instant invention gives linearly improved melt stability. A similar effect is observed in comparing comparative example 66 to example 66. In example 67 the level of standard phosphite stabilization system is varied. The fact that the melt stability of this example 66 is no different that example 67 indicates that the standard phosphite stabilization system is not important, rather the instant invention is important.

Experimental Procedure P-20: Preparation of a Solvent Blue 101 Concentrate:

Into 999 g of polycarbonate resin powder (I.V.=0.35) was added 1.0 g of Solvent blue 101 (CAS#6737-68-4). The mixture was blended thoroughly using a high speed Harbill paint mixer.

Experimental Procedure P-21: Preparation of Comparative Example 64:

This preparation was used as a masterbatch for all of the resins in Table 8. Into 20.0 Kg of polycarbonate resin powder (phenol end capped and 0.53 I.V. nominal) was added 60.0 g of 2-(2H-benzotriazol-2-yl)-4-(1,1,3,3-tetramethylbutyl)-phenol, 20.0 g of Solvent violet 36, and 12.0 g of Solvent blue 101 concentrate (described above). The mixture was blended thoroughly using a tumble blender.

Experimental Procedure P-22: Preparation of Example 64:

Into 2.0 Kg of polycarbonate resin powder Master Batch (described above) was added 0.60 g of flame retardant J1 and 8.00 g of 2% TNPP/phosphorous acid concentrate (procedure P-9). The mixture was blended thoroughly using a high speed Harbill paint mixer. This mixture was blended in similar fashion, extruded, and chopped as Example 1. A 30 mm (L/D=29/1) Werner-Pfleiderer twin screw extruder at 300 rpm and 300° C was used with vacuum venting.

TABLE 9

Comparison of the Invention with Classical and Diphosphite Stabilization - Effects on Complex Viscosity Ratio

|  | Resin | Q | CVR initial | CVR 300° C. @30 min | Initial Viscosity (poise) | Viscosity Change (%) |
|---|---|---|---|---|---|---|
| Comp. Ex. 67 | K | — | 1.46 | 1.90 | 1000 | 40 |
| Comp. Ex. 68 | K | C | 1.46 | 1.68 | 930 | 7 |
| Example 68 | K | A | 1.46 | 1.52 | 950 | 13 |
| Comp. Ex. 69 | L | — | 1.69 | 2.93 | 4700 | 59 |
| Comp. Ex. 70 | L | C | 1.69 | 2.47 | 5050 | 33 |
| Example 69 | L | A | 1.69 | 1.95 | 5360 | 14 |

Experimental Procedure P-23: Preparation of Comparative Example 67:

Rheological tests were performed on a Rheometrics Dynamic Spectrometer (RDS 7700). Samples were dried in an air circulating oven at 125° C. for 4 hours, then they were melted between two parallel plates of the RDS. A nitrogen blanket was used to prevent oxidation. Viscosity stability was tested at 300° C for 30 min at a frequency of 10 rad/s and a strain amplitude of 10%. The shear sensitivity was measured by an internal CVR method. CVR stands for the Complex Viscosity Ratio. The CVR is equal to the complex viscosity at 1 rad/s divided by the complex viscosity at 100 rad/s, with the temperature of measurement chosen so that the complex viscosity at 100 rad/s is equal to 20,000 poise.

Experimental Procedure P-24: Example 68:

Into 50.0 g of polycarbonate resin K (described above) was added 0.16 g of 2% TNPP/phosphorous acid concentrate (procedure P-9). The mixture was blended thoroughly using tumble blending. This mixture was extruded with a CSI MAX Mixing Extruder (Model CS-194AV). Other examples in Table 9 were prepared in a similar fashion.

Interpretation of Table 9:

The shear sensitivity stability of melt processed polymers is a very critical parameter for consistent processing materials. CVR is a measurement of this material parameter. This table indicates that the use of a di-(nonylphenyl) phosphite gives some improvement in the CVR stability of melt polymerized polycarbonates, but that the use of the instant invention of tris-(nonylphenyl) phosphite and phosphorous acid gives unexpectedly better performance that observed with any other system. It is most desirable when the CVR does not change with increasing time or increasing temperature.

TABLE 10

The Interactive Effects of Hindered and Non-Hindered Phosphite Esters with Phosphorous and Phosphoric Acids on Color Formation in Polycarbonate

|  | D (phr) | M (phr) | N (phr) | O (phr) | YI @1 min | YI @6 min | ΔYI |
|---|---|---|---|---|---|---|---|
| Comp. Ex. 71 | — | — | — | — | 2.64 | 4.84 | 2.20 |
| Comp. Ex. 72 | 0.0075 | — | — | — | 2.55 | 4.84 | 2.12 |
| Comp. Ex. 73 | — | — | 0.0075 | — | 2.22 | 3.54 | 1.32 |
| Comp. Ex. 74 | 0.03 | — | — | — | 2.49 | 4.00 | 1.51 |
| Comp. Ex. 75 | — | 0.03 | — | — | 1.94 | 2.25 | 0.31 |
| Comp. Ex. 76 | 0.0075 | — | 0.001 | — | 2.12 | 2.42 | 0.30 |
| Comp. Ex. 77 | 0.0075 | — | — | 0.0012 | 2.39 | 2.82 | 0.23 |
| Example 70 | — | 0.0075 | 0.001 | — | 2.19 | 2.50 | 0.31 |
| Example 71 | — | 0.0075 | — | 0.0012 | 2.48 | 2.69 | 0.21 |
| Example 72 | 0.03 | 0.0075 | 0.001 | — | 1.81 | 2.18 | 0.37 |
| Example 73 | 0.03 | 0.0075 | — | 0.0012 | 2.00 | 2.32 | 0.32 |

Experimental Procedure P-25: Preparation of a 1% Phosphorous Acid Solution:

22.22 ml of 45% aqueous phosphorous acid was added to a clean 1000 ml volumetric flask. This was filled to the line with distilled water to make a 1% phosphorous acid solution.

Experimental Procedure P-26: Preparation of a 1.195% Phosphoric Acid Solution:

13.94 ml of 85.7% aqueous phosphoric acid was added to a clean 1000 ml volumetric flask. This was filled to the line with distilled water to make a 1.195% phosphoric acid solution.

Experimental Procedure P-27: Preparation of a 2.0% TNPP Concentrate:

Into 98 g of polycarbonate resin powder (I.V.=0.53) was added 2.0 ml of tris-(nonylphenyl) phosphite. The mixture was blended thoroughly using a high speed Harbill paint mixer. The mixture was stored in a glass container with a moisture resistant lid.

Experimental Procedure P-28: Preparation of Comparative Example 71:

86 Kg of polycarbonate resin E was thoroughly blended in a high speed ribbon blender to make a powder preblend. 2 Kg of this powder was then extruded and chopped into pellets to give comparative example 71. A 30 mm (L/D=29/1) Werner-Pfleiderer twin screw extruder at 300 rpm and 300° C. was used with vacuum venting. The resulting pellets were molded into 2 in ×3 in ×⅛ in plaques on a 15 ton Boy injection molding machine using a 1 minute cycle time at 640F for a standard sample and a 6 minute cycle time at 640F for an abusive molding cycle. The first few samples were thrown away and samples were retained after color equilibrium was attained. At least 3 samples, but usually the first 5 samples, were not retained. The next 8 color stable samples were then kept. These conditions give base conditions and abusive conditions. Color (YI) was measured on a Pacific Scientific Gardner Laboratory XL-835 instrument for eight samples of each. Delta YI is the difference between the 1 minute and 6 minute cycle times.

Experimental Procedure P-29: Preparation of Example 70

Into 2 Kg of the blended powder from experimental procedure P-28 was added 1 ml of 1% phosphorous acid solution, as described in experimental procedure P-25, and 0.0075 phr of tris-(nonylphenyl) phosphite, as described in experimental procedure P-27, and 0.001 phr of phosphorous acid, as described in experimental procedure P-25. This powder was then extruded and chopped into pellets to give Comparative Example 71. A 30 mm (L/D=29/1) Werner-Pfleiderer twin screw extruder at 300 rpm and 300° C. was used with vacuum venting. The resulting pellets were molded into 2 in×3 in×⅛ in plaques on a 15 ton Boy injection molding machine using a 1 minute cycle time at 640F for a standard sample and a 6 minute cycle time at 640F for an abusive molding cycle. The first few samples were thrown away and samples were retained after color equilibrium was attained. At least 3 samples, but usually the first 5 samples, were not retained. The next 8 color stable samples were then kept. These conditions give base conditions and abusive conditions. Color (YI) was measured on a Pacific Scientific Gardner Laboratory XL-835 instrument for eight samples of each. Delta YI is the difference between the 1 minute and 6 minute cycle times.

Explanation of Table 10

Samples were prepared in a manner similar to that described for the two samples that are explained in experimental procedures P-28 and P-29.

Interpretation of Table 10

Comparative examples 71 to 77 demonstrate various stabilizer systems that are known to those skilled in the art. Comparative example 75 is probably the oldest of these, but has been supplanted by more hindered, stable phosphite stabilizers, such as shown in comparative example 74, due to the high variability of tris-(nonylphenyl) phosphite, which is well known to those skilled in the art. These examples show the interactive effects that occur. Examples 70 and 71 show a significant interaction that was previously unknown. Examples 72 and 73 show a significant three way interaction that was previously unknown. Phosphoric acid has the added advantage that it has U.S. Food and Drug Administration Generally Recognized As Safe (FDA GRAS) status, which allows for use in food contact and other FDA compliant applications.

Experimental Procedure P-30: Preparation of a 2.0 % TNPP Phosphorous Acid Concentrate on low I.V. Polycarbonate Powder:

This sample was prepared exactly like experimental procedure P-5, except that the polycarbonate resin powder used was 0.35 I.V.

TABLE 11

The Effect of the Invention on Color Formation in Polycarbonate Based Resin Blends

| Additive | | P | VISUAL OBSERVATIONS | |
|---|---|---|---|---|
| Type | (phr) | (ppm) | @1 min | @6 min |
| Comp. Ex. 78 | R | 6.0 | 0 | 8 | 9 |
| Example 74 | R | 6.0 | 80 | 2 | 9.5 |
| Comp. Ex. 79 | S | 6.0 | 0 | 3 | 10 |
| Example 75 | S | 6.0 | 80 | 1 | 10 |
| Comp. Ex. 80 | T | 5.0 | 0 | 2 | 4 |
| Example 76 | T | 5.0 | 80 | 2 | 3 |
| Comp. Ex. 81 | U | 3.0 | 0 | 2 | 3 |
| Example 77 | U | 3.0 | 80 | 2 | 3 |
| Comp. Ex. 82 | V | 25.0 | 0 | 4 | 6 |
| Example 78 | V | 25.0 | 80 | 2 | 4 |
| Comp. Ex. 83 | W | 3.0 | 0 | 1 | 2 |
| Example 79 | W | 3.0 | 80 | 0 | 1 |

Explanation of Table: 11

Samples were prepared as in experimental procedure P-29, except the listed ingredients were used. These samples are all opaque and it is more difficult to measure colors and color changes with these systems. Hence, colors were judged on an empirical system, with an exponential scale from 0 to 10, in which 0 was excellent and 10 was terrible. This is not a linear scale, because the differences in ratings are very slight, per unit change, at the low end of the scale, but very large at the high end of the scale. This is done because as materials start to degrade the variability increases dramatically. Hence, it is easier to detect small differences for samples with very little degradation. These samples were all judged by a panel of 2 scientists that are skilled in the art.

Interpretation of Table: 11

In all cases, the use of the instant invention shows equivalent or better performance than the control.

TABLE 12

Effect of the Invention on Color Formation in Polycarbonate Containing UV Stabilizers

| Additive | | P | YI@ | YI@ | |
|---|---|---|---|---|---|
| Type | (phr) | (ppm) | 1 min | 6 min | ΔYI |
| Comparative Example 84 | X | 0.3 | 0 | 3.42 | 7.12 | 3.70 |
| Example 80 | X | 0.3 | 80 | 2.78 | 3.35 | 0.57 |
| Comparative Example 85 | Y | 0.3 | 0 | 3.45 | 4.48 | 1.03 |
| Example 81 | Y | 0.3 | 80 | 2.76 | 3.37 | 0.61 |

Explanation of Table 12:

At 0.3 phr, UV stabilizers can cause a color instability in polycarbonate resins. The invention produced an improved color stability in all cases.

Samples were prepared as in experimental procedure P-29, except the listed ingredients were used.

TABLE 13

Model System Studies Demonstrating the Deactivation Potential of Various Phosphites, Acids, and Water

| | Z μl | AA μl | AB μl | AC μl | AD μl | Water μl | Transesterification @ 30 min. (%) | @60 min (%) |
|---|---|---|---|---|---|---|---|---|
| Example 82 | 200 | — | 200 | — | — | — | 2.0 | 0.92 |
| Example 83 | — | 200 | 200 | — | — | — | 2.6 | 1.2 |
| Comp. Ex. 86 | — | — | — | 200 | — | — | 75.6 | 80.0 |
| Comp. Ex. 87 | — | — | — | 200 | — | 50 | — | 1.6 |
| Comp. Ex. 88 | — | — | — | — | 200 | — | 91.8 | 110 |
| Comp. Ex. 89 | — | — | — | — | 200 | 50 | — | 11.0 |
| Comp. Ex. 90 | — | — | — | — | — | — | 98.8 | 110 |

Interpretation of Table: 13

This test is a model system type test to gain understanding of how stabilizers and quenchers work in complicated polymer systems. This table helps explain why inconsistencies are observed with the use of classical phosphite stabilization systems. The performance of these systems are highly dependent upon moisture content.

Experimental Procedure P-31: Transesterification Test

Disodium BPA solution: Into 100 ml of water was dissolved 0.0591 g of disodium BPA, 100 μl of this solution into 1 g of reaction mixture delivers 10 ppm of sodium.

Into a culture tube was charged 100 μl of the disodium BPA solution described above. The tube was heated in a heat block at 125° C. to drive off the water. Upon cooling, the tube was spiked with the additives as shown in the table and the solvent removed at 95° C. The tube was then charged with phenyl paracumyl carbonate (1.0 g) and the tube was heated at 250° C. and samples taken at 30 min and 60 min. The samples are analyzed via HPLC and the relative mole % of diphenyl carbonate (DPC), phenyl paracumyl carbonate (PCC), and di-paracumyl carbonate (DCC) was determined. Theoretical equilibrium is a 1:2:1 mixture of the DPC:PCC:DCC. Percent reaction was calculated as (2* mole % PCC)/(mole % DPC+mole % PCC+mole % DCC).

Having described the invention that which is claimed is:

1. A composition for treating a thermoplastic polymer comprising:

(1) a phosphorus containing acid of the formula $H_mP_tO_n$ where m and n are each 2 or greater and t is 1 or greater and (2) an ester of a phosphorus containing acid of the formula $(R_1O)(R_2O)(R_3O_w)H_xP_yO_{z-3}$ where w is 0 or 1, where x is zero or a positive integer, z is 3 or greater, y is 1 or greater, and $R_1$, $R_2$ and $R_3$ are the same or different organic radicals selected from the group of substituted aryl substituents having the formula:

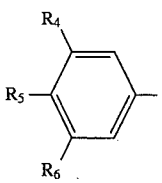

where $R_4$, $R_5$, and $R_6$ may be the same or different and wherein $R_4$, $R_5$, and $R_6$ are selected from the group consisting of alkyl radicals having from one to nine carbon atoms and hydrogen, subject to the limitation that at least one of $R_4$, $R_5$, and $R_6$ is not hydrogen.

2. The composition of claim 1 wherein the acid is phosphorous acid.

3. The composition of claim 1 wherein the acid is phosphoric acid.

4. The composition of claim 1 wherein the ester is tris(nonylphenyl)phosphite.

5. The composition of claim 2 wherein the ester is tris(nonylphenyl)phosphite.

6. The composition of claim 3 wherein the ester is tris(nonylphenyl)phosphite.

7. A thermoplastic polymer containing an effective amount of a composition for stabilizing the color and viscosity of said thermoplastic polymer comprising:

(1) a phosphorus containing acid of the formula

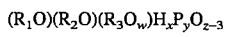

where m and n are each 2 or greater and t is 1 or greater, and (2) an ester of a phosphorus containing acid of the formula $$(R_1O)(R_2O)(R_3O_w)H_xP_yO_{z-3}$$

where w is 0 or 1, where x is zero or a positive integer and z is 3 or greater, y is 1 or greater, and $R_1$, $R_2$ and $R_3$ are the same or different organic radicals selected from substituted aryl substituents having the formula:

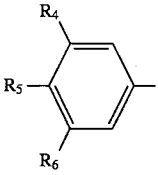

where $R_4$, $R_5$, and $R_6$ may be the same or different and wherein $R_4$, $R_5$, and $R_6$ are selected from the group consisting of alkyl radicals having from one to nine carbon atoms and hydrogen, subject to the limitation that at least one of $R_4$, $R_5$, and $R_6$ is not hydrogen.

8. The polymer of claim 7 wherein the acid is phosphorous acid.

9. The polymer of claim 7 wherein the acid is phosphoric acid.

10. The polymer of claim 8 wherein the ester is tris(nonylphenyl)phosphite.

11. The polymer of claim 9 wherein the ester is tris(nonylphenyl)phosphite.

12. The polymer of claim 10 wherein said polymer comprises a polycarbonate.

13. The polymer of claim 11 wherein said polymer comprises a polycarbonate.

14. The polymer of claim 7 wherein the acid is present in an amount ranging from about 0.00005 phr to about 0.1000 phr.

15. The polymer of claim 7 wherein the ester is present in an amount ranging from about 0.00035 phr to about 0.7000 phr.

16. The polymer of claim 7 wherein the acid and ester are present in a ratio of about one equivalent of acid to about two moles of ester.

17. The polymer of claim 7 additionally comprising a hindered phosphite ester.

18. The polymer of claim 17 wherein the hindered phosphite ester is tris(2,4-di-tertiary-butylphenyl)phosphite.

19. The composition of claim 14 wherein the tris(2,4-di-tertiarybutylphenyl)phosphite is present in an amount ranging from about 0.0001 phr to about 0.200 phr.

20. The polymer of claim 17 wherein the unhindered phosphite ester is tetrakis(2,4-di-tertiary-butylphenyl)-1,1'-biphenyl-4,4'-diylbisphosphonite.

21. A thermoplastic polymer containing an effective amount of a composition for stabilizing the color and viscosity of said thermoplastic polymer consisting essentially of:

(1) a phosphorus containing acid, and (2) an ester of a phosphorus containing acid, wherein the phosphorus containing acid has the formula:

where m and n are each 2 or greater, and t is 1 or greater, wherein the ester has the formula:

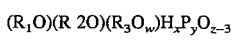

where w is 0 or 1, where x is zero or a positive integer and z is 3 or greater, y is 1 or greater, and $R_1$, $R_2$ and $R_3$ are the same or different radicals selected from substituted aryl substituents having the formula:

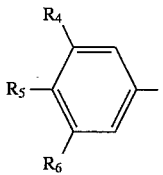

where $R_4$, $R_5$, and $R_6$ may be the same or different and wherein $R_4$, $R_5$, and $R_6$ are selected from the group consisting of alkyl radicals having from one to nine carbon atoms and hydrogen, subject to the limitation that at least one of $R_4$, $R_5$, and $R_6$ is not hydrogen.

22. A method for improving the stabilization of the physical and chemical properties of a thermoplastic polymer comprising:

(1) preparing said thermoplastic polymer, and (2) treating said polymer with the composition of claim 1.

23. The method of claim 22 wherein said thermoplastic polymer is selected from the group consisting of polyesters, copolyesterpolycarbonates, and polycarbonates.

24. The method of claim 23 wherein the acid is phosphorous acid.

25. The method of claim 23 wherein the acid is phosphoric acid.

26. The method of claim 24 wherein the ester is tris(nonylphenyl)phosphite.

27. The method of claim 25 wherein the ester is tris(nonylphenyl)phosphite.

28. In a method for the stabilization of thermoplastic polymers by the addition of esters of phosphorus containing acids having the formula:

$$(R_1O)(R_2O)(R_3O_w)H_xP_yO_{z-3}$$

where w is 0 or 1, where x is zero or a positive integer and z is 3 or greater, y is 1 or greater, and $R_1$, $R_2$, and $R_3$ are the same or different organic radicals selected from substituted aryl substituents having the formula:

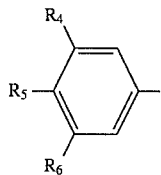

where $R_4$, $R_5$, and $R_6$ may be the same or different and wherein $R_4$, $R_5$, and $R_6$ are selected from the group consisting of alkyl radicals having from one to nine carbon atoms and hydrogen, subject to the limitation that at least one of $R_4$, $R_5$, and $R_6$ is not hydrogen to said thermoplastic polymers; the improvement consisting essentially of the addition of a phosphorus containing acid having the formula:

$$H_mP_tO_n$$

where m and n are each 2 or greater, and t is 1 or greater whereby catalysts, catalyst residues and other additives are deactivated and the polymer is stabilized.

29. The method of claim 28 wherein the polymer is a polycarbonate.

30. The method of claim 29 wherein the acid is phosphorous acid.

31. The method of claim 29 wherein the acid is phosphoric acid.

32. The method of claim 30 wherein the ester is tris-(nonylphenyl)phosphite.

33. The method of claim 31 wherein the ester is tris-(nonylphenyl)phosphite.

34. An article of manufacture comprising the polymer of claim 12.

35. An article of manufacture comprising the polymer of claim 13.

* * * * *